R. W. JOHNSON & L. L. YOUNG.
TRUSS.
No. 176,182. Patented April 18, 1876.
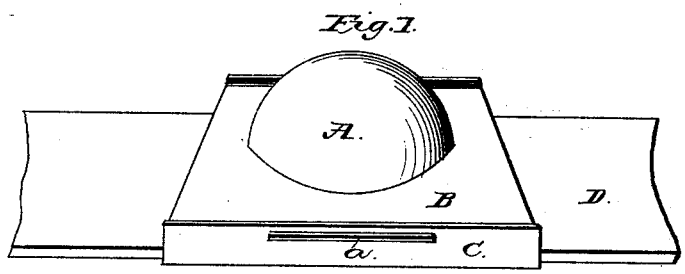
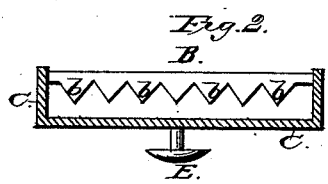
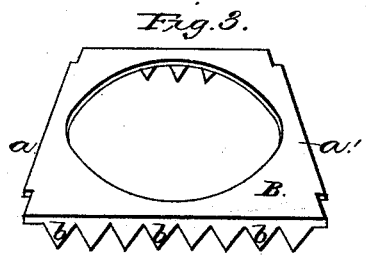

UNITED STATES PATENT OFFICE.

ROICE W. JOHNSON AND LEMUEL L. YOUNG, OF FORT DODGE, IOWA, ASSIGNORS TO ROICE W. JOHNSON, OF SAME PLACE.

IMPROVEMENT IN TRUSSES.

Specification forming part of Letters Patent No. 176,182, dated April 18, 1876; application filed October 22, 1875.

*To all whom it may concern:*

Be it known that we, R. W. JOHNSON and L. L. YOUNG, of Fort Dodge, in the county of Webster and State of Iowa, have invented a new and useful Improvement in Fastenings for Trusses, which improvement is fully set forth in the following specification, reference being had to the accompanying drawings, in which—

Figure 1 is a perspective view, showing the fastening adjusted to the rubber hemisphere A and the belt D. Fig. 2 is an end view, and Fig. 3 is a perspective view, of the plate B, showing the projections $a$ and $a'$, and the teeth $b$ $b'$, &c.

The object of our invention is to securely fasten the rubber hemisphere A to the belt D, and still to admit of its being taken off and moved to other parts of the belt D readily.

In carrying out our invention we construct the metal plate C with two sides turned up, as shown in the drawings, and the plate C is supplied with a metal button, E. The plate C is further constructed with two slots, one in each of the two sides.

The plate B has a hole through it of the proper size to fit around the rubber hemisphere A, and is further supplied with two projections, $a$ and $a'$, one on each side. The object of each is to fit into the slots in the plate C. The plate B is further supplied on each end with the teeth $b$ $b'$, &c.

The operation of our invention is as follows: The belt D is placed in the plate C, and the rubber hemisphere A is adjusted to the plate B. The projections $a$ and $a'$ on the plate B are inserted in the slots of the side pieces of the plate C by springing the same open to admit the projections $a$ and $a'$.

When the plate B is forced into place the teeth $b$ $b'$, &c., are forced into the belt D, thus holding the hemisphere A firmly to the belt D.

We desire to apply our invention to a certain truss, for which Letters Patent No. 167,977 were granted September 21, A. D. 1875, to L. L. Young and John Thistle; but it may be used with any elastic belt.

What we claim as our invention, and desire to secure by Letters Patent, is—

The combination, in a truss-fastening, of the slotted plate C with the toothed plate B, with its projections $a$ $a'$, as and for the purposes as shown and described.

ROICE W. JOHNSON.
LEMUEL L. YOUNG.

Witnesses:
MARSHALL YOUNG,
ISAAC GARMOE.